(12) United States Patent
Jarvis

(10) Patent No.: US 8,444,166 B1
(45) Date of Patent: May 21, 2013

(54) TRANSPORT SYSTEM

(71) Applicant: Charles Dwight Jarvis, Jonesboro, GA (US)

(72) Inventor: Charles Dwight Jarvis, Jonesboro, GA (US)

( * ) Notice: Subject to any disclaimer, the term of this patent is extended or adjusted under 35 U.S.C. 154(b) by 0 days.

(21) Appl. No.: 13/657,857

(22) Filed: Oct. 22, 2012

(51) Int. Cl.
*B62B 1/20* (2006.01)

(52) U.S. Cl.
USPC ............... 280/415.1; 280/515; 280/47.31; 280/47.34

(58) Field of Classification Search
USPC ........... 280/47.31, 47.32, 653, 47.131, 27.34, 280/415.1, 515; 37/434
See application file for complete search history.

(56) References Cited

U.S. PATENT DOCUMENTS

| | | | | |
|---|---|---|---|---|
| 1,032,009 A * | 7/1912 | Long | | 298/3 |
| 1,103,759 A * | 7/1914 | Gnatzig | | 298/3 |
| 1,590,000 A * | 6/1926 | Trowe | | 298/3 |
| 2,037,222 A * | 4/1936 | Farrar | | 298/3 |
| 3,028,698 A * | 4/1962 | Schmitt | | 172/252 |
| 5,350,030 A * | 9/1994 | Mawhinney et al. | | 180/19.3 |
| 5,915,723 A * | 6/1999 | Austin | | 280/651 |
| 6,446,989 B1 * | 9/2002 | Intengan | | 280/47.34 |
| 6,508,478 B1 * | 1/2003 | Ortez | | 280/47.34 |
| 7,140,630 B2 * | 11/2006 | Abel | | 280/292 |
| 7,296,807 B2 * | 11/2007 | Zimmerman | | 280/47.32 |
| 2008/0084038 A1 * | 4/2008 | Byers | | 280/47.34 |

* cited by examiner

*Primary Examiner* — Tony Winner
(74) *Attorney, Agent, or Firm* — Charlena Thorpe, Esq.; The Law Office of Charlena Thorpe, Inc.

(57) ABSTRACT

The apparatuses and methods disclosed herein may be pushed by hand or pulled by a motor vehicle. Thus, implementations of the transport device disclosed herein may have functions akin to a wheelbarrow or a dumping trailer yet may provide easier and/or more efficient transportation and dumping functions over prior art wheelbarrows and dumping trailers. Implementation of the transport device disclosed herein also may be easier to push over an elevation or up a hill. Furthermore, in some implementations, the transport device disclosed herein includes four wheels and therefore can function like a cart. Still further, in some implementations, the transport device disclosed herein can have the functions of a wagon. In some implementations, the transport device includes a work bench.

14 Claims, 16 Drawing Sheets

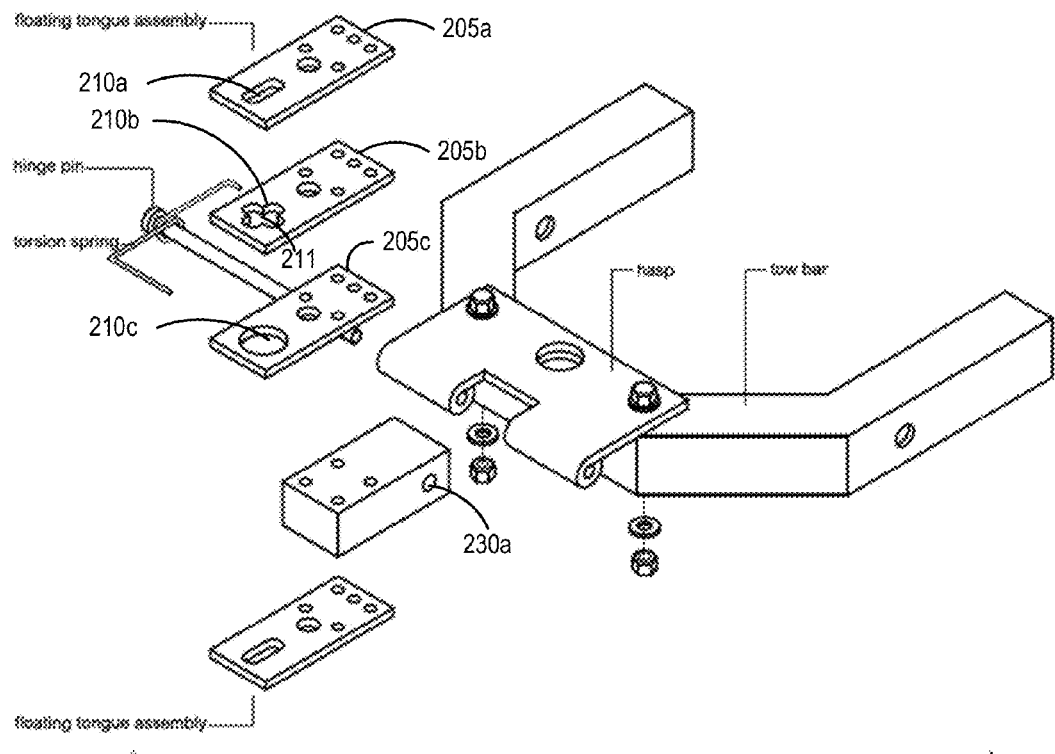
FIG. 2A
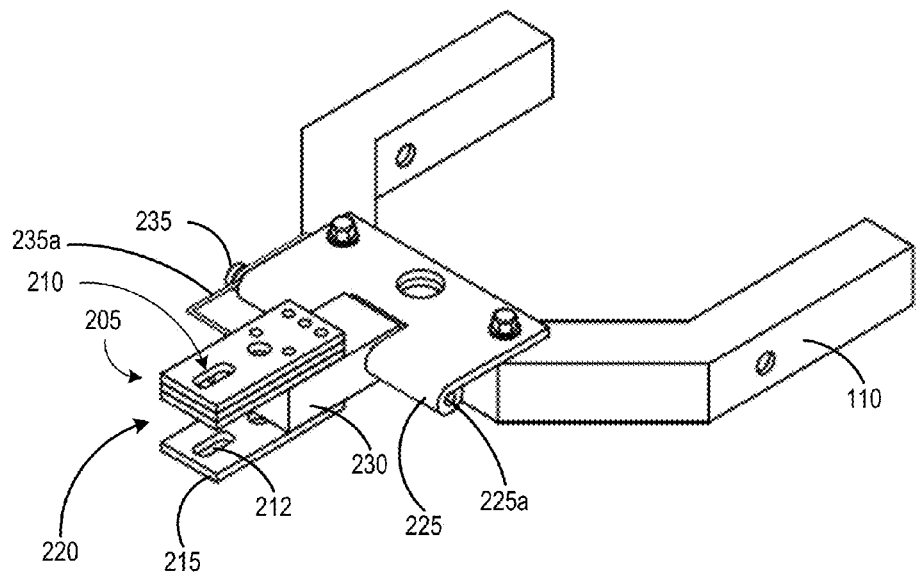

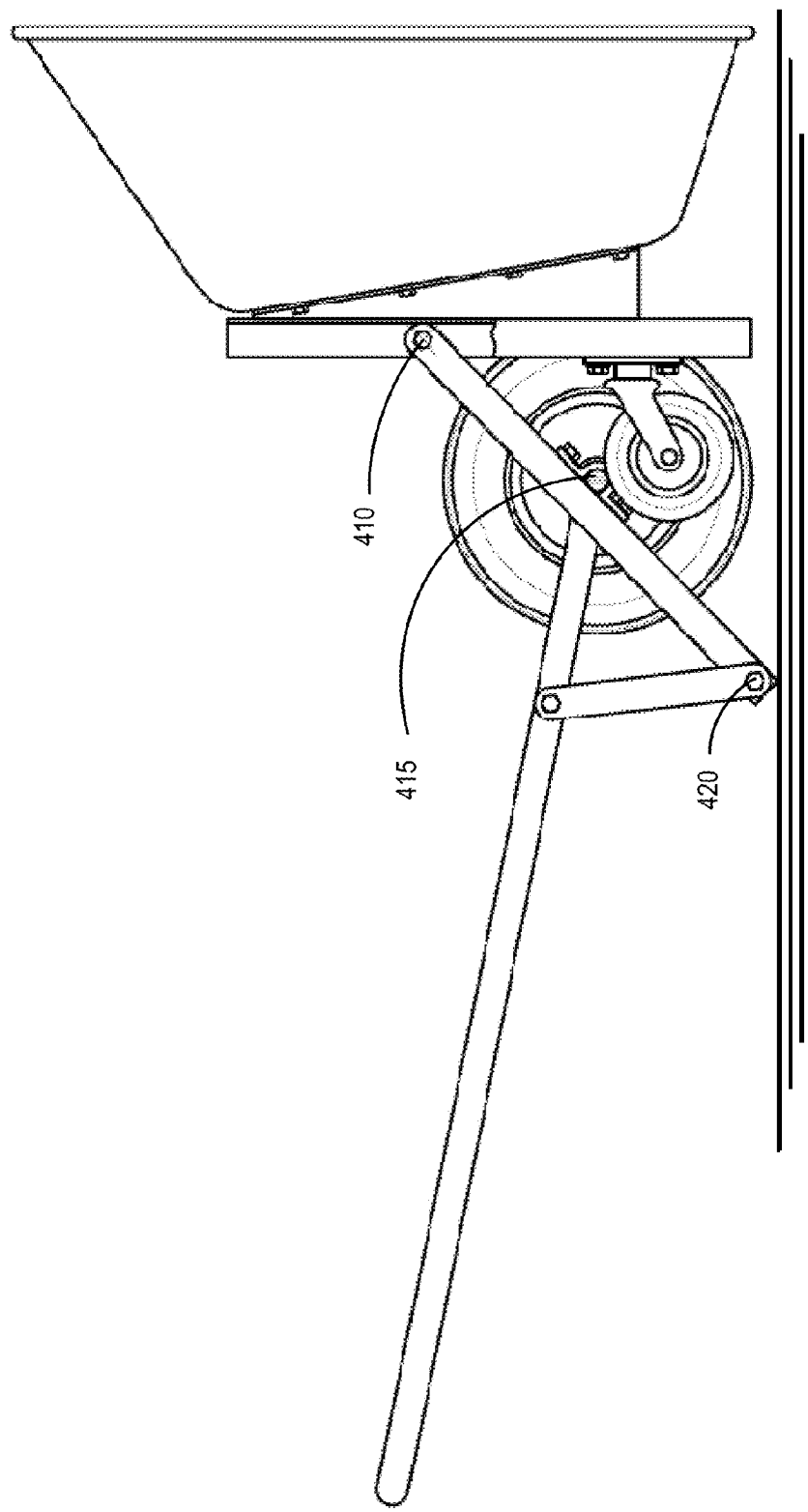

TRANSPORT SYSTEM

TECHNICAL FIELD

This disclosure relates to a transport system.

BACKGROUND

The wheelbarrow has been used for centuries to transport loads. In these many years, the functional design of the wheelbarrow has settled to what is believed to be the optimal design. However, the wheelbarrow has many inherently problems due to its functional design.

First, the wheelbarrow and the load must be substantially symmetrical about the mid-line that runs from the front wheel to the midpoint between the handles. If not handled properly by an operator, an improperly loaded wheelbarrow can become unbalanced, especially when turning, and fall to the side thereby undesirably dumping at least part of its load.

Second, lifting and dumping the load in a wheelbarrow can be physically demanding. To dump a load, the operator must have the strength to raise the handles and the coordination to avoid prematurely dumping it.

Third, lowering the handles shifts the center of gravity toward the operator and increases the load on the operator's hands.

Fourth, because the handles must be lowered to do so, wheelbarrows are very difficult to push up a hill or over an elevation such as a curb.

The above problems may be magnified for people with physical impairments or vertically challenged.

Dumping trailers also are used to transport loads. However, dumping trailers are designed to be used by hitching them to riding lawn mowers. That is, dumping trailers are not designed to be conveniently pushed by an operator. Furthermore, dumping trailers cannot fully dump a load due to their limited range of motion. Thus, the operator must physically remove the portion of the load that was not automatically dumped from the dumping trailer during the dumping action.

BRIEF DESCRIPTION OF THE DRAWINGS

FIG. 2A illustrates an example implementation of a tongue adapter.

FIGS. 4A-D illustrate the dumping function of a transport device according to the principles of the present disclosure.

FIGS. 5A-D illustrate an example implementation of an adjustable handle.

DETAILED DESCRIPTION

Various implementations of this disclosure provide apparatuses and methods for transporting and dumping loads. The implementations of the transport device disclosed herein may be pushed by hand or pulled by a motor vehicle. Thus, implementations of the transport device disclosed herein may have functions akin to a wheelbarrow or a dumping trailer yet may provide easier and/or more efficient transportation and dumping functions over prior art wheelbarrows and dumping trailers. Implementation of the transport device disclosed herein also may be easier to push over an elevation or up a hill. Furthermore, in some implementations, the transport device disclosed herein includes four wheels and therefore can function like a cart. Still further, in some implementations, the transport device disclosed herein can have the functions of a wagon. In some implementations, the transport device includes a work bench.

Figure 1A:
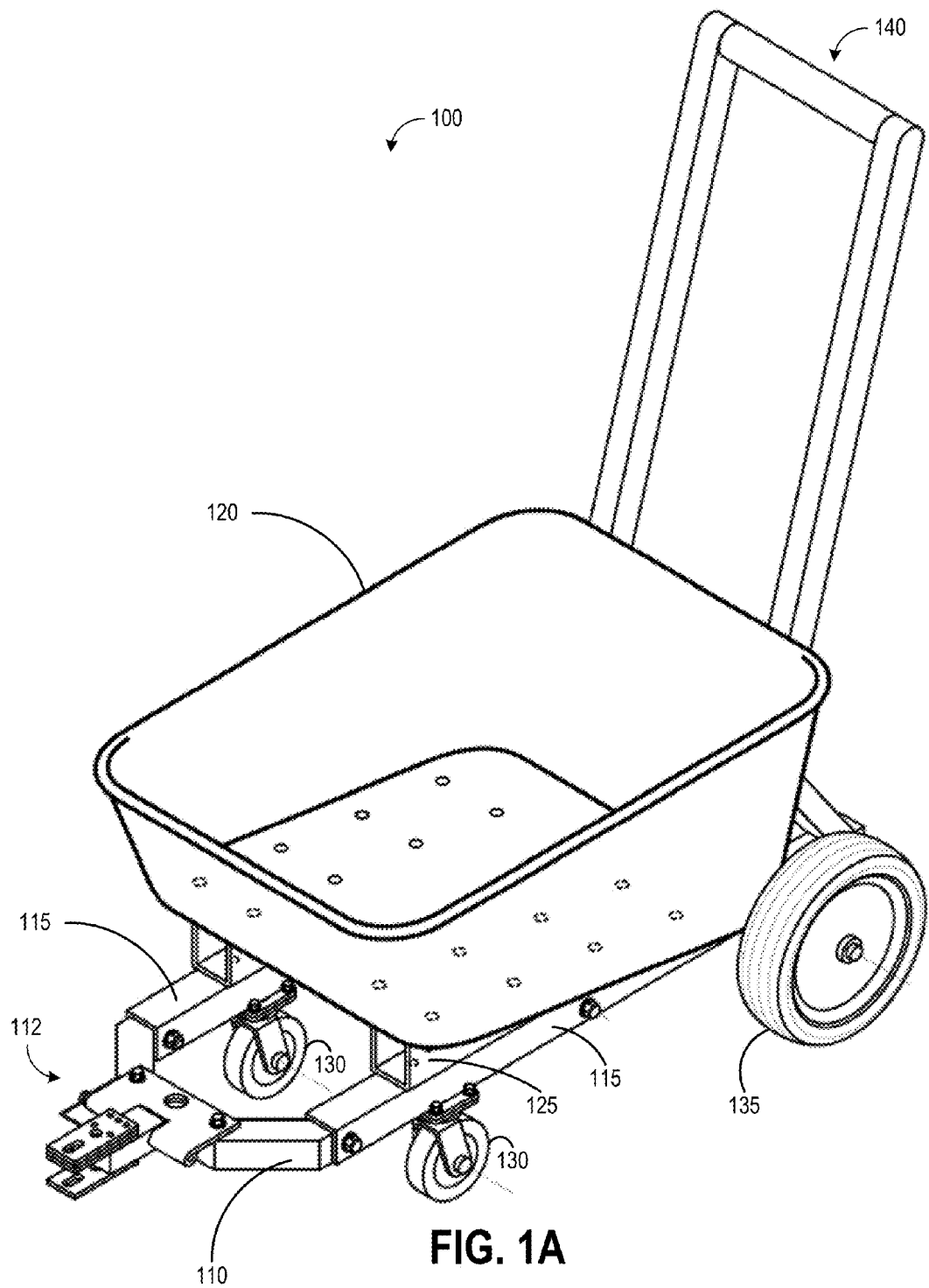
FIGS. 1A-1C illustrate an example implementation of a transport device according to the principles of the present disclosure.
Figure 1B:
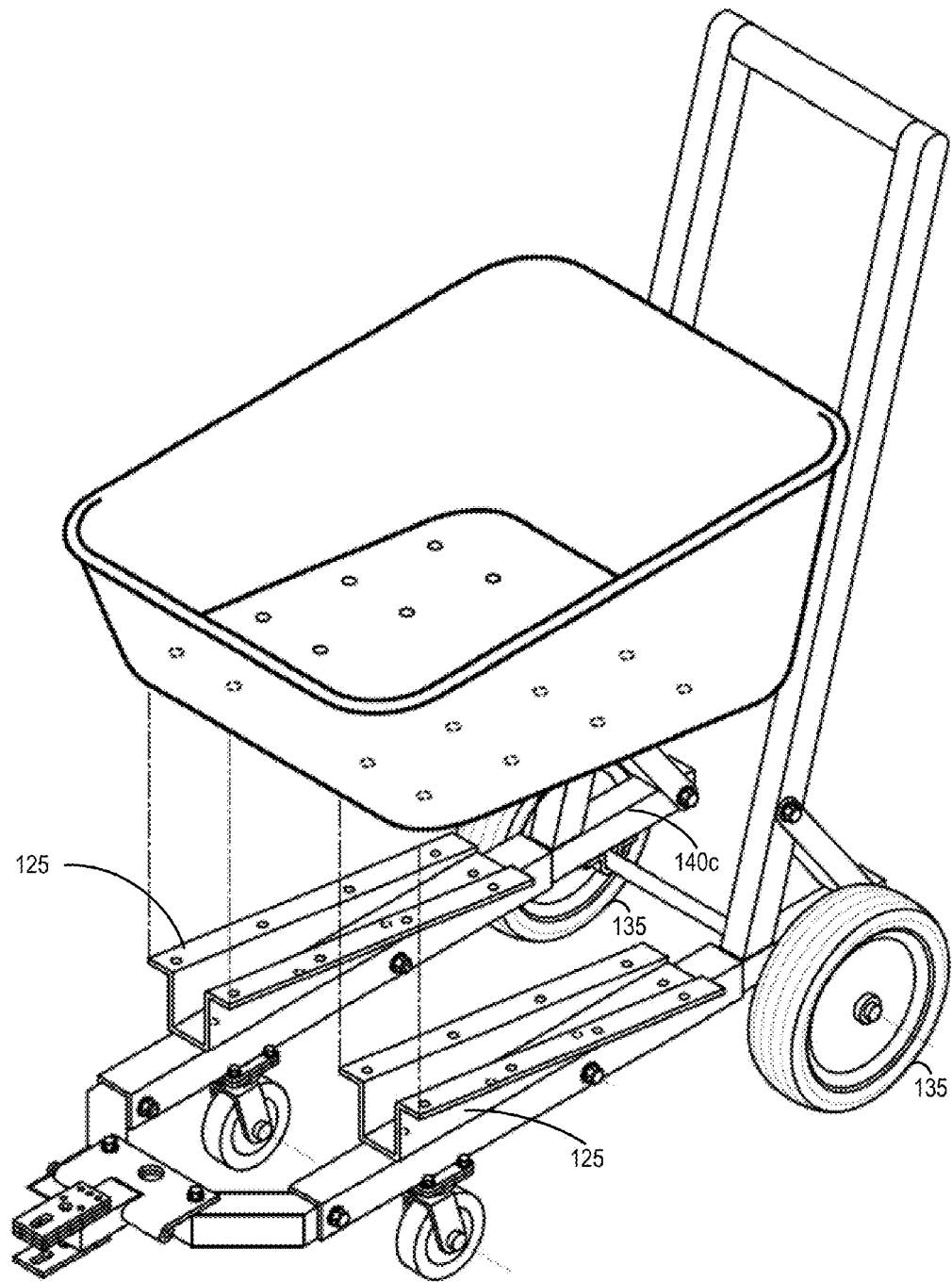
Figure 1C:
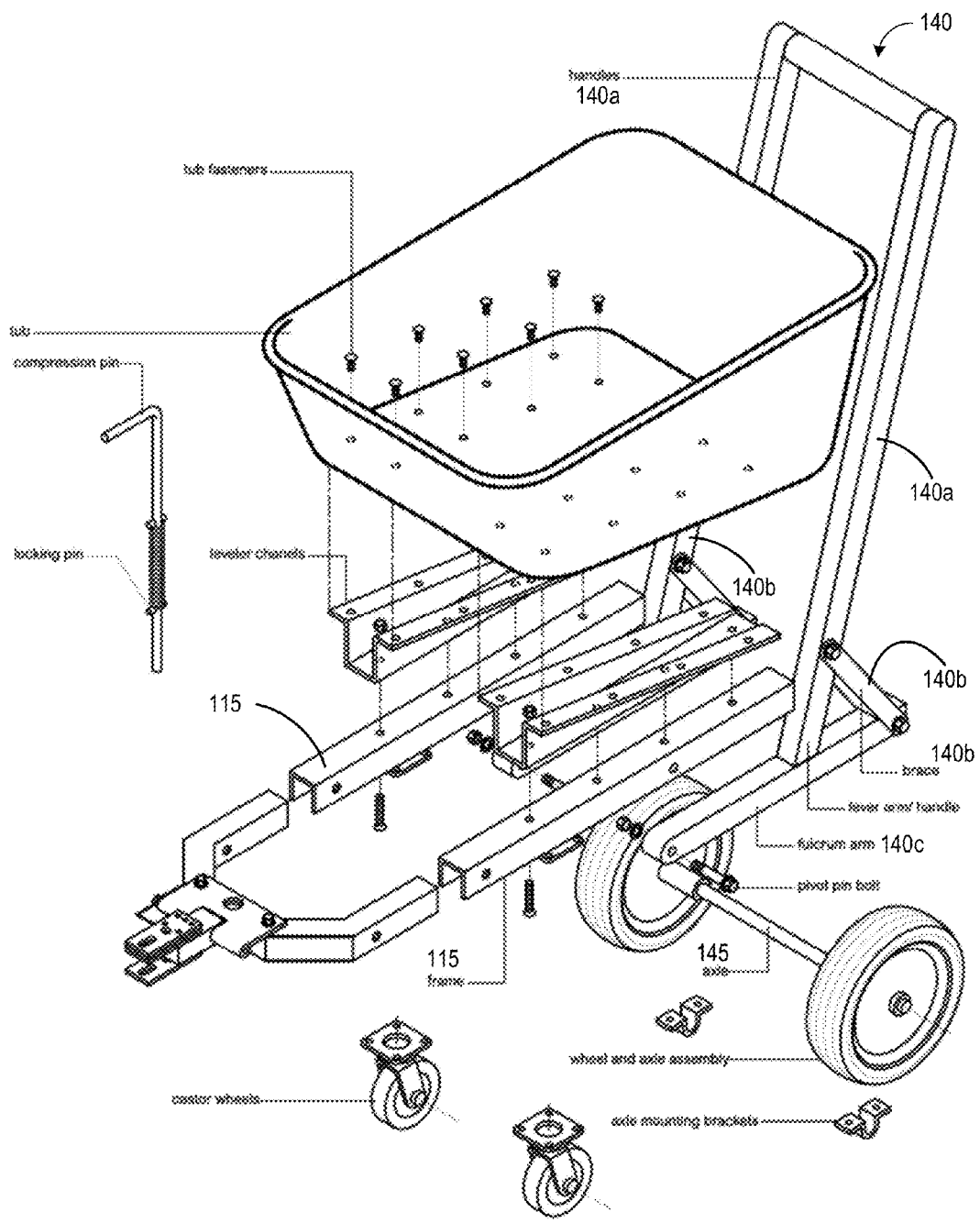

FIGS. 1A-1C illustrate an example implementation of a transport device 100 according to the principles of the present disclosure. The transport device 100 comprises a frontend tongue assembly 110, a tongue adapter 112, a frame 115, a tub 120, levelers 125, front wheels 130, back wheels 135, and a dumping assembly 140.

The tongue adapter 112 can be attached to the frontend assembly 110 to attach the transport device 100 to a motor vehicle having a traditional tow bar as described in U.S. patent application Ser. No. 13/541,654 entitled "Floating Hitching System" (i.e., tow bar 140 of FIG. 1 of the '654 patent application), which is incorporated by reference in its entirety.

As shown in FIG. 2A, an example implementation of a tongue adapter 112 comprises a top portion 205 having a hole assembly 210, a bottom portion 215 having a hole 212, and an opening 220 between the top portion 205 and the bottom portion 215. In some implementations, the opening 220 can have a height of up to twelve inches. In some implementations, the opening 220 can have a height greater than twelve inches. In some implementations, the height of the opening 220 can be less than 8 inches. In some implementations, the height of the opening can be based on the size of a wheel of the transport device or the vertical location of the tow bar on the motor vehicle.

In some implementations, the top portion 205 comprises three plates 205a, b, c having holes 210a, b, c, respectively. In some implementations, the hole assembly 210 comprises the three holes 210a, b, c.

Figure 2B:
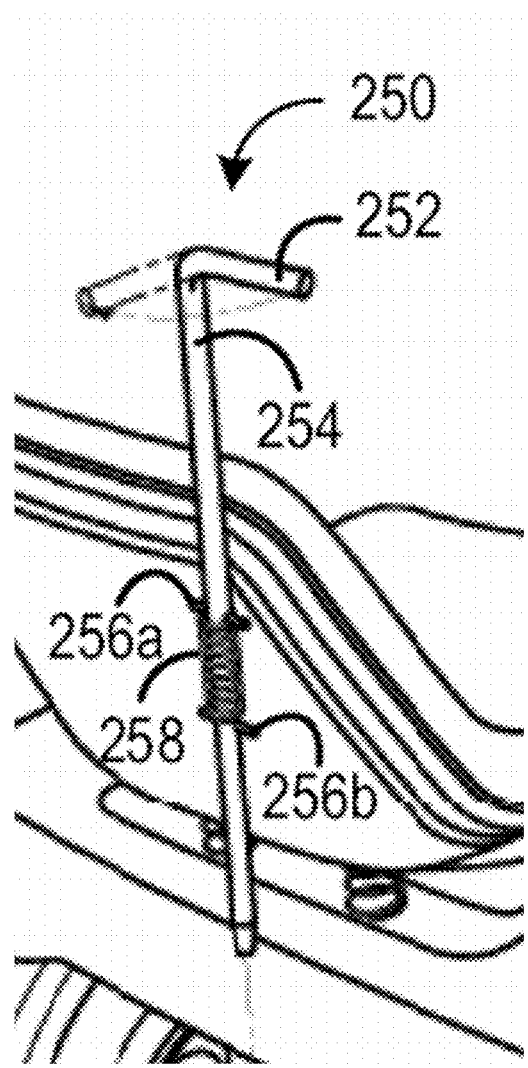
FIG. 2B illustrates an example hitching pin.

The tongue adapter 112 is configured to be used with the hitching pin 250 of the '654 patent application, which is reproduced in FIG. 2B.

To hitch a transport device to a motor vehicle using the tongue adapter 112, a tow bar of the motor vehicle is positioned between the top portion 205 and the bottom portion 215 of the tongue adapter 112 (i.e., the tow bar is positioned in the opening 220 of the tongue adapter 112) and the hole of the tow bar and hole 212 of the bottom portion 215 are aligned.

The hole assembly 210 is configured to receive the lower portion of the shaft 254 and the second dowel pin 256b of the hitching pin 250 when the second dowel pin 256b is in a first direction lengthwise. The compression spring 258 is of a sufficient diameter such that the compression spring 258 is blocked by the top portion 205 of the tongue adapter 112. When the bottom of the compression spring 258 rests on the top portion of the tongue adapter 112, the lower portion of the shaft 254 is of a sufficient length such that the end of the shaft 254 can be received by the hole of the tow bar and the hole 212 of the bottom portion 215.

As the handle 252 of the hitching pin 250 is pushed down, the compression spring 258 is compressed, and then the handle 252 of the hitching pin 250 is rotated to position the second dowel pin 256b in a second direction lengthwise to align the second dowel pin 256b with a slot 211 of the plate 205b to receive both ends of the second dowel pin 256b. In some implementations, the handle 252 is rotated 90 degrees from the first direction (that is, the first direction and the second direction are at right angles).

Once the second dowel pin 256b is aligned with the slot 211, the handle 252 is released so that both ends of the second dowel pin 256b can be received by the slot 211 thereby both hitching the transport device to the motor vehicle and securing the hitching pin in place.

In some implementations, the tongue adapter 112 further comprises a connector 225 such as a hasp and a spacer 230. The connector can be any connector adapted to connect the tongue adapter 112 to the frontend assembly 110. The connector 225 attaches to the frontend assembly 110. In some implementations, the connector 225 can be attached to the frontend assembly 110 via bolts as shown in FIG. 2A.

In some implementations, one end of the spacer 230 is positioned between the top portion 205 and the bottom portion 215 of the tongue adapter 112 and the other end of the spacer 230 is connected to the connector 225.

In some implementations, the spacer 230 is attached to the connector 225 via a hinge pin 235 that goes through a hole in the spacer 230 (e.g., hole 230a) and a hole in the connector 225 (e.g. hole 225a).

The horizontal hole 230a in the spacer 230 allows the spacer to rotate about the hinge pin 235 thereby providing a floating action for the tongue adaptor 112.

In some implementation, a torsion spring 235a is provided. One end of the torsion spring 235a may be attached to the connector and the other end may be attached to the spacer 230. The torsion spring 235a may help to keep the spacer 230 level with the connector 225, but also may allow the tongue adapter 112 to rotate as required in the operation of the transport device. The torsion spring may help to maintain the tongue adaptor 112 in a horizontal position when no force is applied to the tongue adaptor, which may help to facilitate hitching the tongue adaptor 112 to the tow bar of a motor vehicle.

In an alternative implementation of the tongue adapter 112, the top portion 205 comprises one plate having a hole (e.g., plate 205a having hole 210a). Furthermore, plate 215 is modified to have bumps or notches to lock the second dowel pin 256b when the compression pin is rotated 90 degrees and released. In some implementations, the length of the second dowel pin 256b may be less than the diameter of the hole in the tow bar of the motor vehicle. In some implementations, this may be achieved by increasing the diameter of the hole in the tow bar of the motor vehicle. In some implementations, the tow bar of the motor vehicle may be modified by machining a slot or by adding an adapter with the required hole and slot to accommodate the shaft and second dowel pin 256b of the hitching pin 250.

Figure 3A:
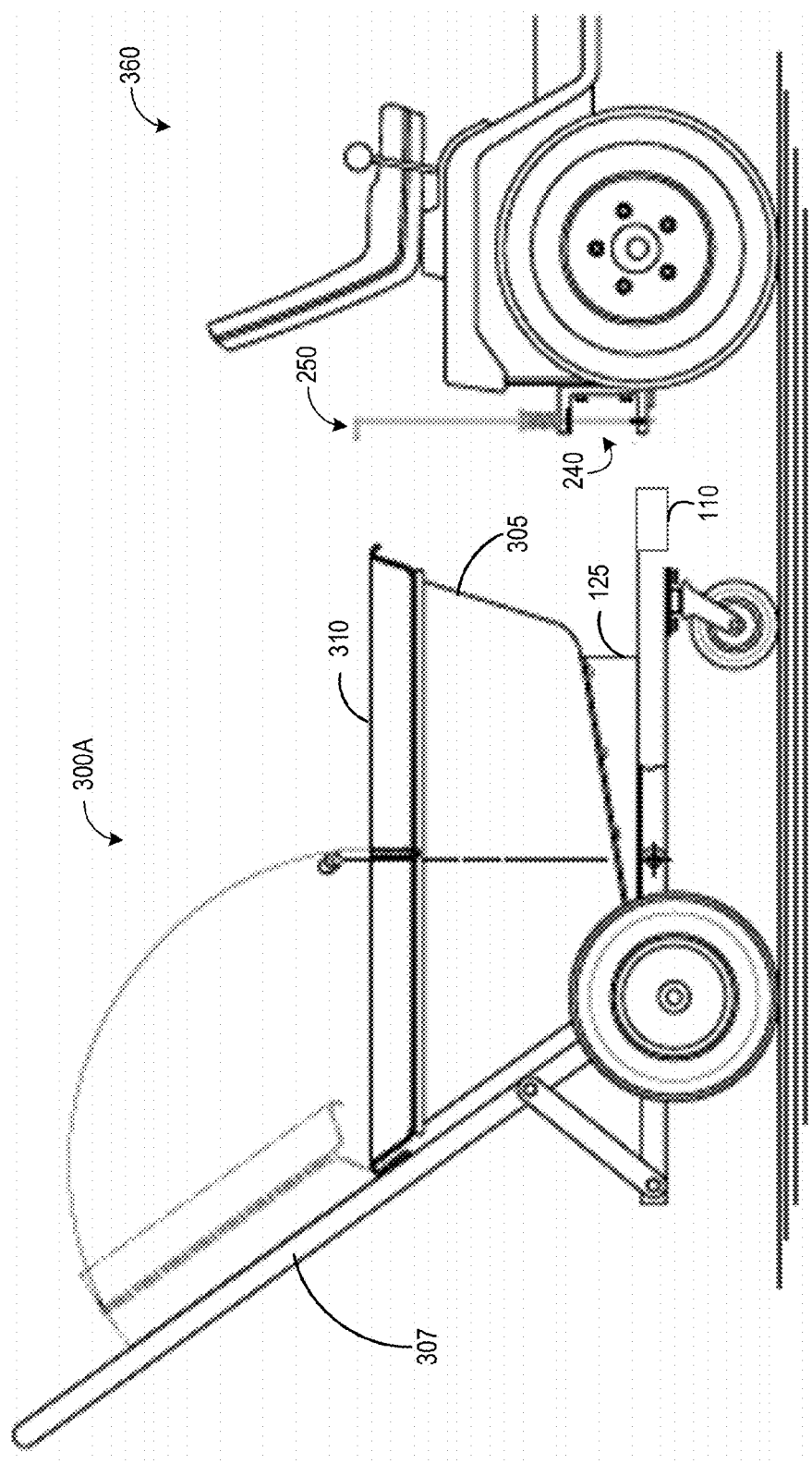
FIG. 3A illustrates a frontend tongue assembly without a tongue adapter to attach a transport device to a motor vehicle that has been equipped with a floating hitch.

Referring to FIG. 3A, the frontend tongue assembly 110 without the tongue adapter 112 can be used to attach a transport device 300A to a motor vehicle 360 that has been equipped with a floating hitch 240 as described in the '654 patent application. The motor vehicle 360 can be any motorized vehicle such as a lawn motor or any other motorized vehicle. In this way, the transport device is enabled to be pulled by a motor vehicle.

Returning to FIGS. 1A-1C, in some implementations, the levelers 125 are connected to the frames 115 and can be used to make level the top of a slanted tub 120. Referring to FIG. 3A, leveling the top of tub 305 may be needed for implementations of a transport device 300A that include a level work bench 310. FIG. 3A illustrates a cross-sectional view of an example work bench 310. The work bench 310 may be attached to the handle 307 and can move with the handle when the handle is pushed down to dump the load in the tub, as discussed below.

Figure 3B:
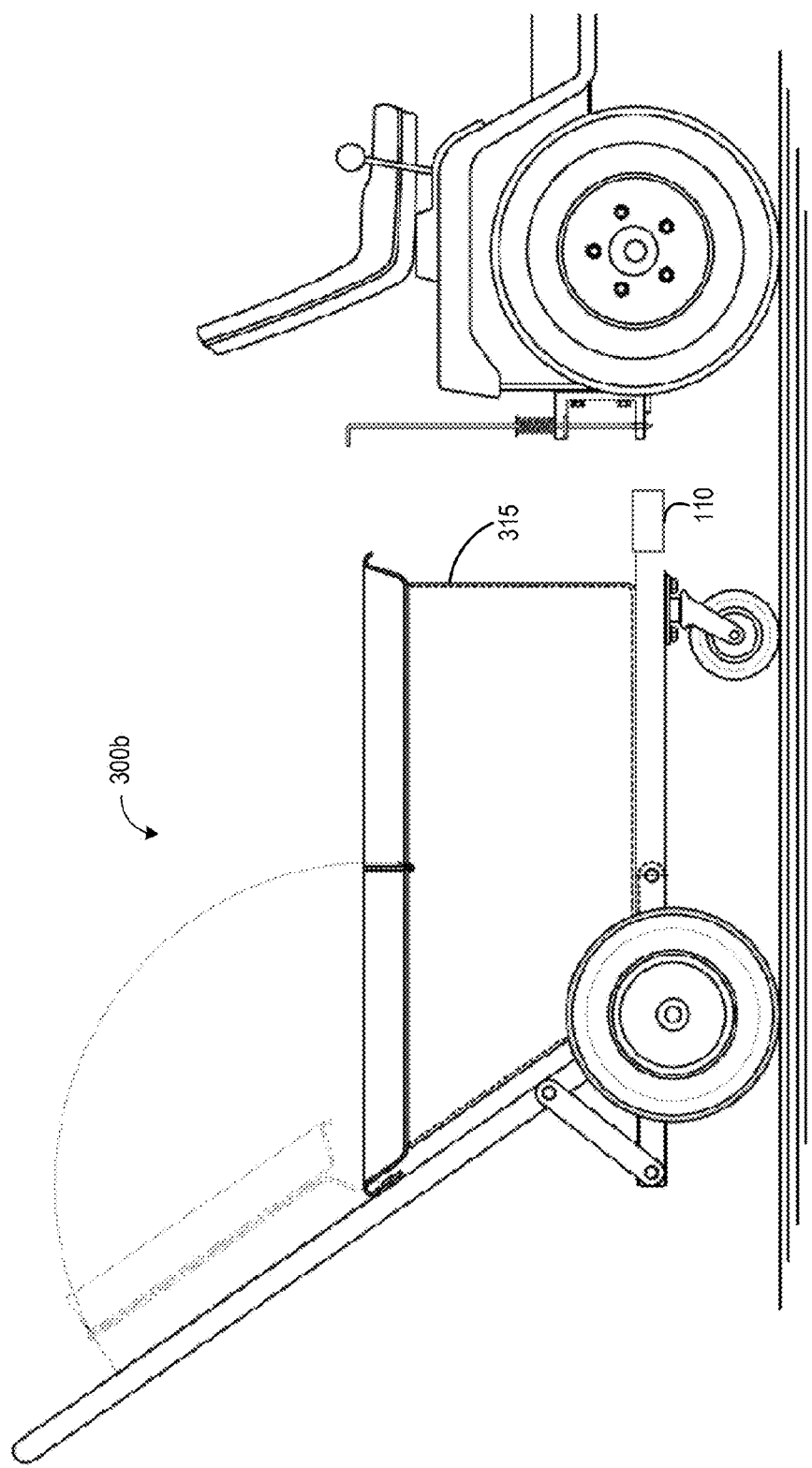
FIGS. 3B and 3C illustrate implementations of a transport device according to the principles of the present disclosure that do not include levelers.
Figure 3C:
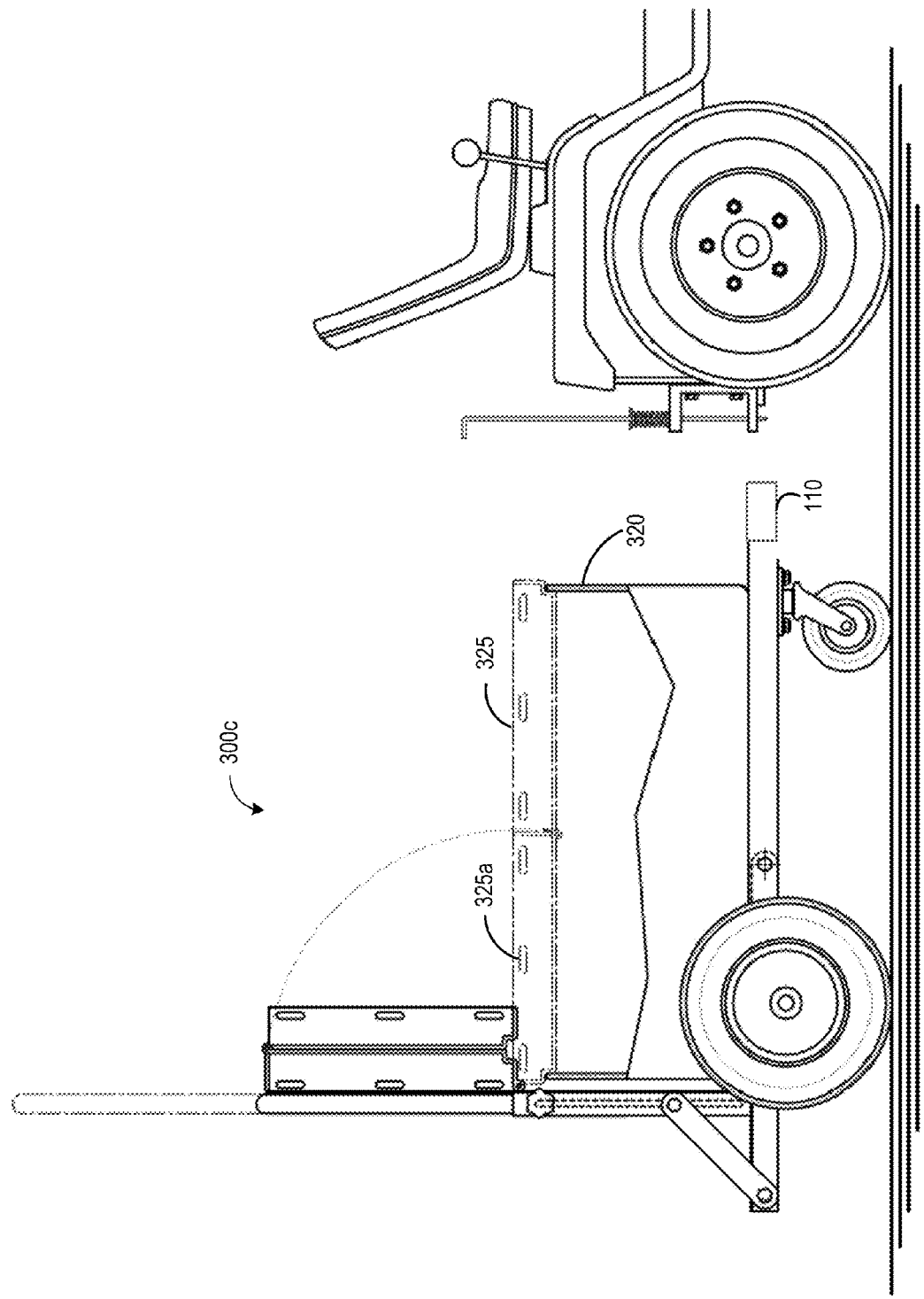

FIGS. 3B and 3C illustrate implementations of a transport device 300b, 300c, respectively, according to the principles of the present disclosure that do not include levelers 125. Flat bottom tubs 315, 320 may be used with such transport devices. FIG. 3C illustrates an another example implementation of a work bench 325 including holes 325a to facilitate attaching a rope or bungee cord to secure items in the work bench 325. In an alternate implementation, holes may be included around the top of the tub to facilitate attaching a rope or bungee cord to secure a load in the tub.

As shown in FIG. 1C, the dumping assembly 140 includes handles 140a, braces 140b, and fulcrum arms 140c. It is noted that the details of the dumping assembly 140 on the left side of the figure may not be shown, however, in some implementation, they are a mirror image of the details on the right side of the figure. The fulcrum arms 140c are pivotally connected to the frames 115, respectively, as shown in FIGS. 1B and 1C, for example. In some implementations, the frames 115 are U-channel frames and the fulcrum arms 140c fit inside the U-channel of the frames 115. The frames 115 and fulcrum arms 140c then may be pivotally connected. In some implementations, the back wheels 135 may be connected by an axle 145 and the fulcrum arms 140c may be attached to the axle 145.

In an alternate implementation, the back wheels may be rigid casters that are bolted to and aligned with fulcrum arms 140c, thus eliminating the axle 145. The fulcrum arms 140c then are pivotally connected to the frames 115 as previously described.

FIGS. 4A-D illustrate the dumping function of a transport device according to the principles of the present disclosure. FIGS. 4A-D illustrate a cross-sectional, side view of a transport device and a cut-away of the fulcrum arm inside the frame. It is noted that the details of the transport device on one side are shown, however, in some implementations, the details of the transport device on the other side are a mirror image of the details shown on the one side.

To dump a load in a tub 405 (e.g., tub 120, tub 305, tub 315, or tub 320), an operator can push down on the handles 140a thereby causing the fulcrum arms 140c to rotate up at a fulcrum point 410 and about a wheel axle 415 and causing the frame 115 to pivot downwardly. In an alternate implementation, when the back wheels are rigid casters, the fulcrum arms 140c rotate about the individual wheel axles of the rigid casters, respectively.

Figure 4A:
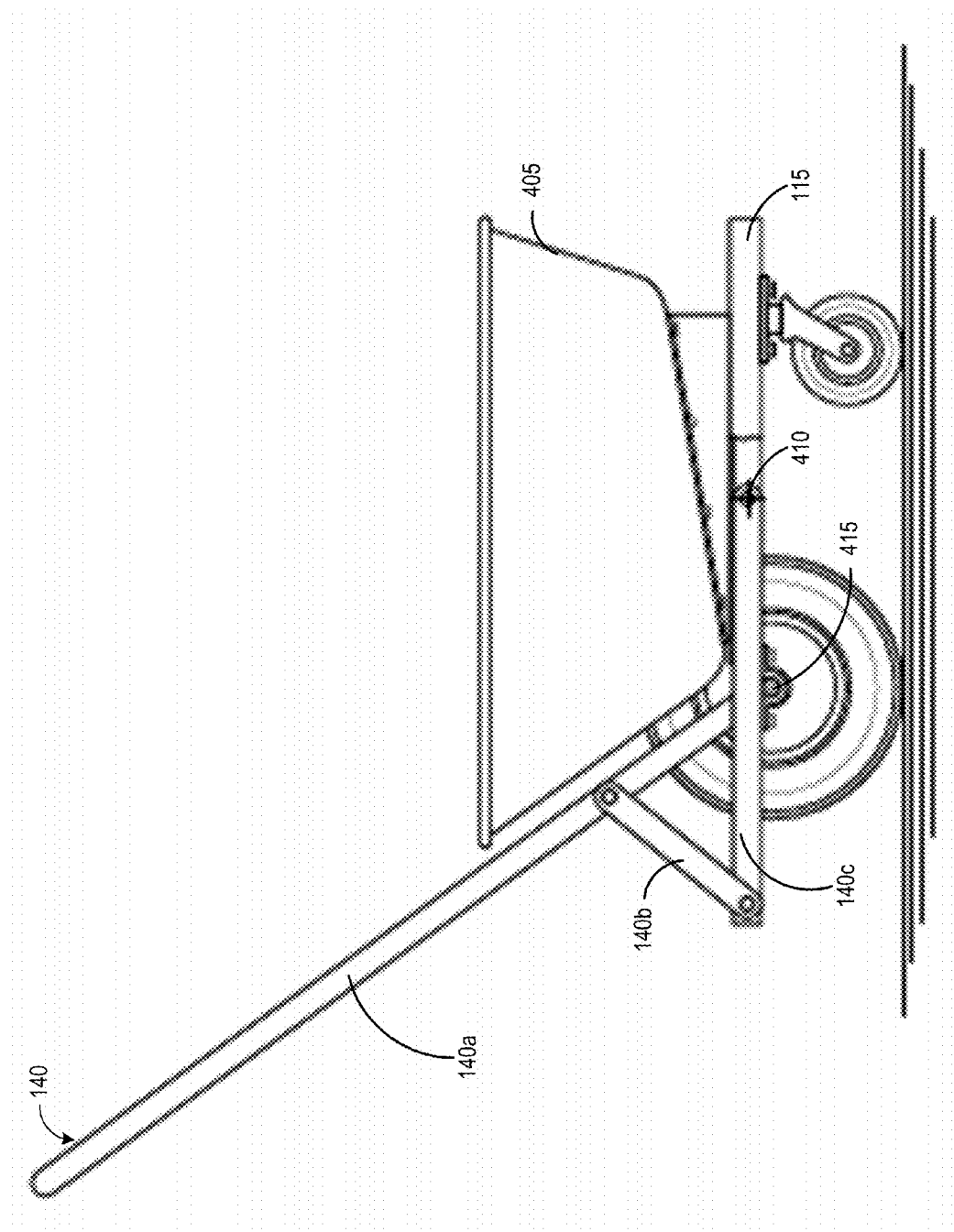
Figure 4B:
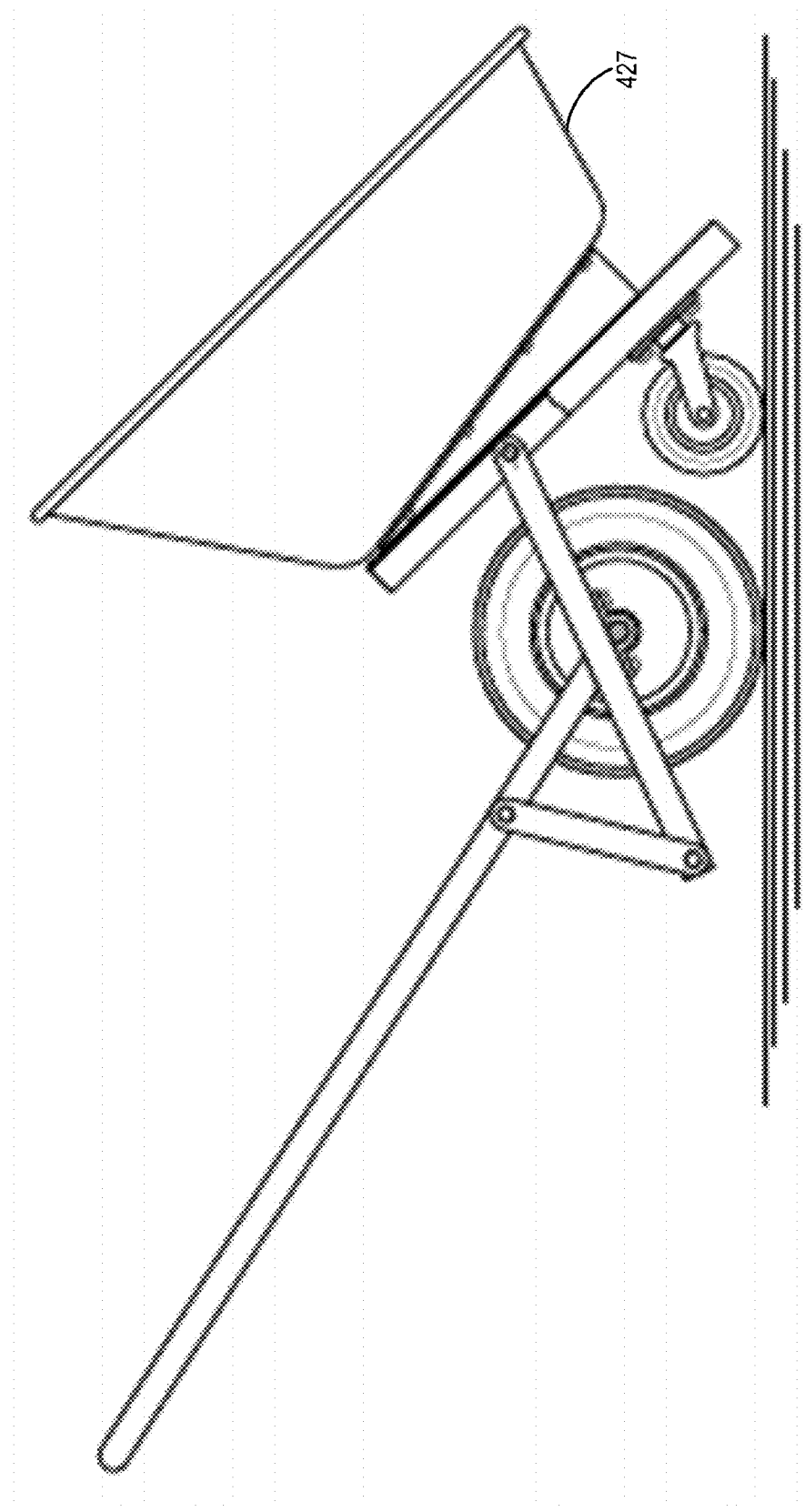
Figure 4D:
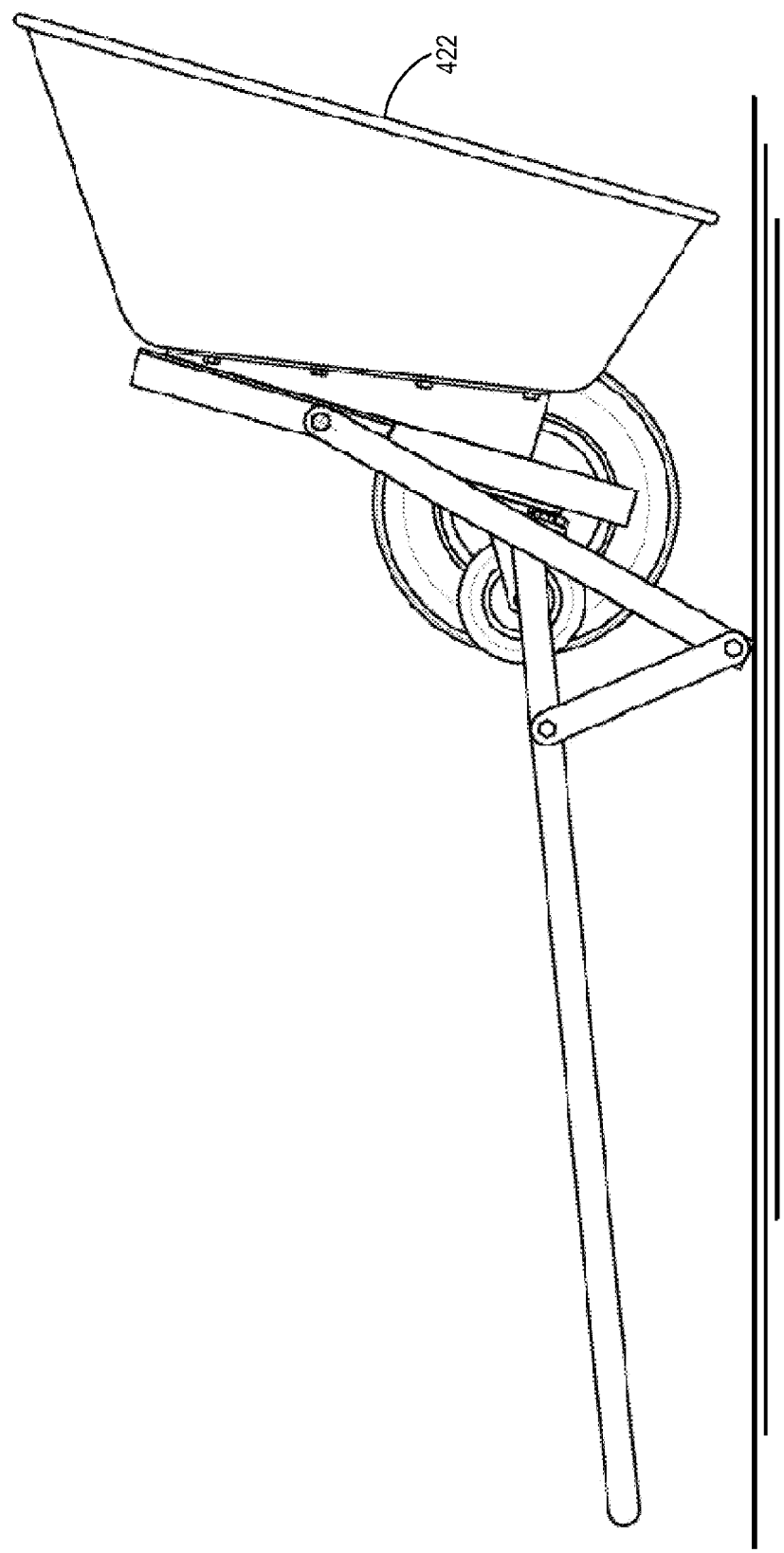

As shown in FIGS. 4B and 4C, the downward pivoting action of the frame 115, to which the tub 405 is attached, can cause the back of the tub 405 to be raised and the front of the tub 405 to be lowered thereby causing a dumping action.

As shown in FIG. 4C, as the operator continues to push down on the handles 140a, the intersection 420 of the brace 140b and the fulcrum arm 140c may make contact with the ground thereby causing the transport device to rotate about the intersection 420 while the fulcrum arms 140c continue to rotate up at the fulcrum point 410 and the frame 115 continues to pivot downwardly. Thus, the back of the tub 405 continues to be raised and the front of the tub 405 continues to be lowered further causing the tub 405 to continue to dump. In some implementations, the frame 115 may rotate beyond 90 degrees from its initial position such that the top plane 422 of the tub 405 slants forward. In this way, the transport device may dump a load more effectively.

In some implementations, the tub may include a gate (not shown) at the front 427 (see FIG. 4B) that can be opened (e.g., by sliding it up) to help facilitate dumping.

Figure 5A:
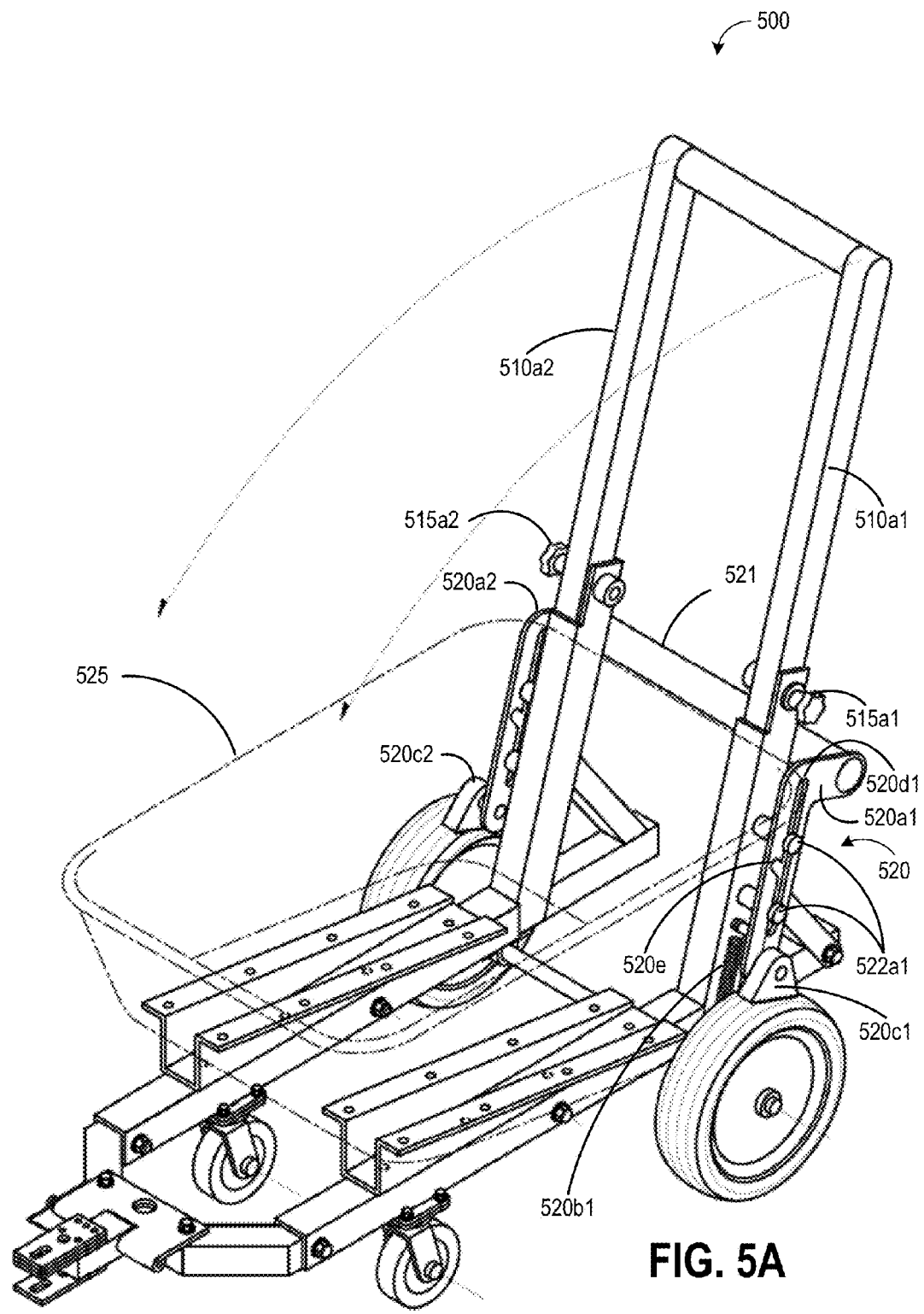
FIGS. 5A, 5C and 5D illustrate another example implementation of a transport device including a braking system according to the principles of the present disclosure.

FIG. 5A illustrates another example implementation of a transport device 500 according to the principles of the present disclosure. The transport device 500 comprises the elements of the transport device 100 but further includes adjustable handles 510a1, a2 and a breaking system 520.

In some implementations, the length of the handles 510a1, a2 may be adjusted by loosening the locking bolts 515a1, a2, adjusting the length of the handles 510a1, a2, and tightening the locking bolts 515a1, a2 to secure the handles 510a1, a2.

Figure 5B:
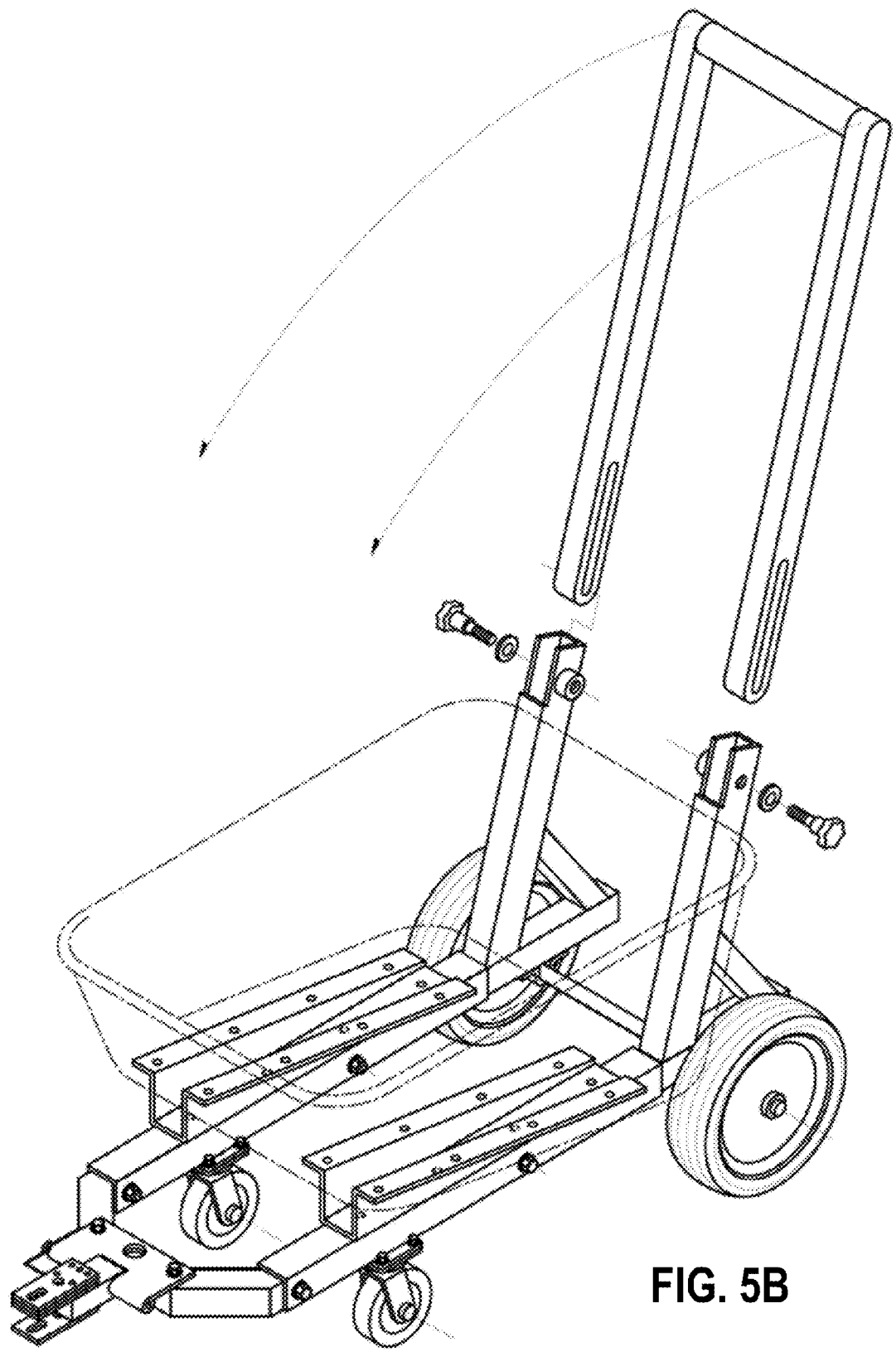

FIG. 5B illustrates an example implementation of the adjustable handles 510a1, a2.

Figure 5C:
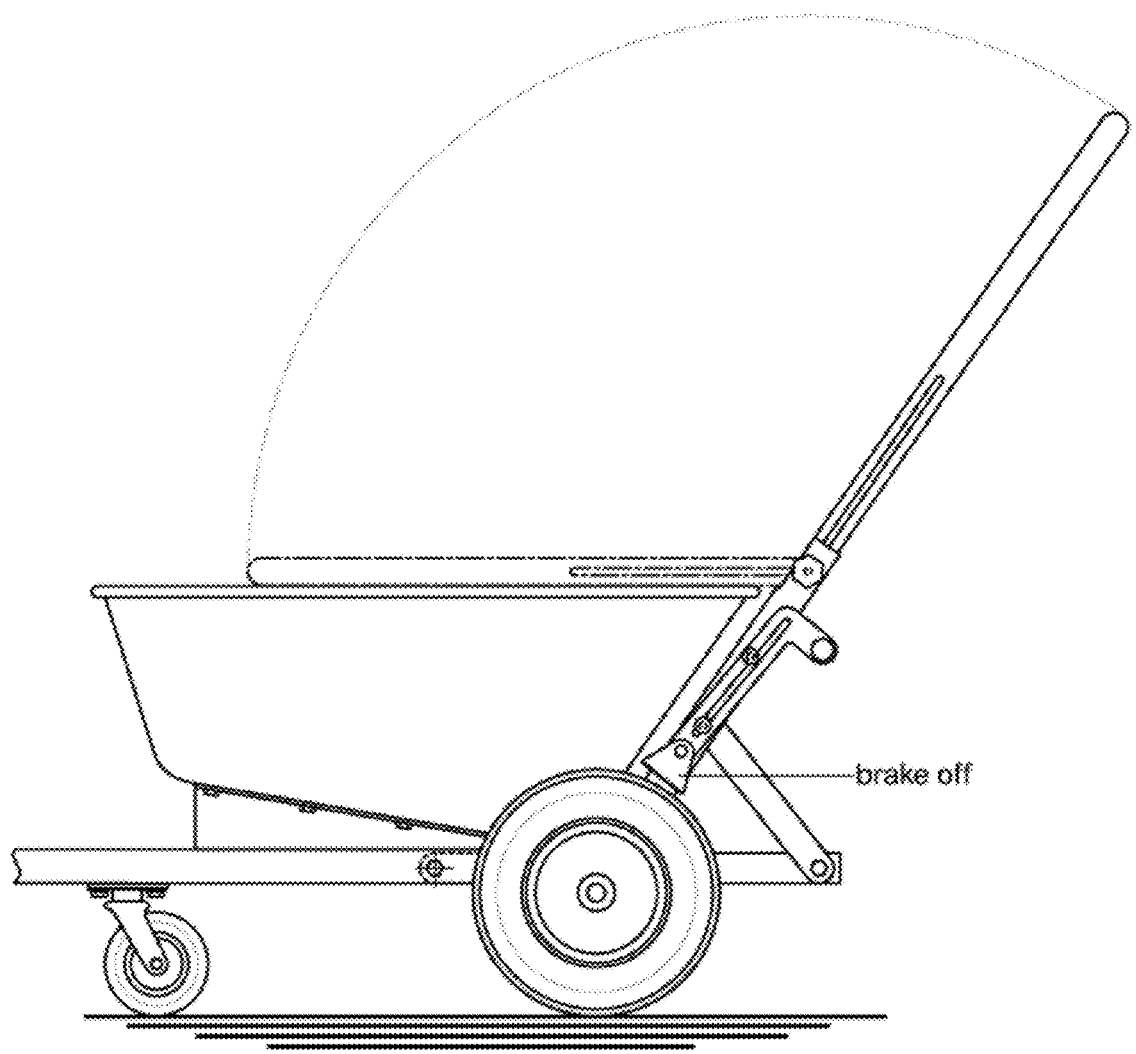

As shown in FIG. 5C, the handles 510a1, a2 can be folded down on top of the tub 525. This can help to reduce the storage space required for the transport device 500.

The adjustable handles 510a1, a1 also can be used to facilitate in the dumping function of a transport device 500. More specifically, to dump a load in the tub 525, the operator may loosen the locking bolts 515a1, a2 and extend the length of the handles for greater leverage during the dumping action. The operator then can push down on the handle to begin the dumping function. At some point, to avoid having to bend the operator's back any further to continue the dumping action, the operator can rotate the handles upward to form a bend in the handle. The operator then can continue to push down on the handle as described above to continue the dumping function of the transport device 500.

In some implementations, the transport device may roll very easily, thus brakes may be provided to help protect an operator when pushing a heavy load uphill, for example. In some implementations, brakes also may be used to park the transport device on a non-level grade, for example.

FIG. 5A illustrates an example implementation of a braking system 520. It is noted that some of the details of the braking system 520 on the left side of the figure are not shown, however, in some implementations, they are a mirror image of the details on the right side of the figure. The brake system 520 includes a handle 521, sliding plates 520a1, a2 attached to the handle 521 on opposite ends; tension springs 520b1, b2 attached to the sliding plate 520a1, 520a2, respectively on one end and attached to the dumping assembly on the other end; brake shoes 520c1, c2; and a pair of bolt assemblies 522a1, a2.

Sliding plates 520a1, a2 are attached to handles 510a1, a2 via the bolt assemblies 522a1, a2, respectively, to keep the brake shoe 520c properly aligned with the wheel. In some implementations, each bolt assembly comprises a threaded rod connector with a bolt and a stop nut. Each of the threaded rod connectors helps to maintain a space between the handles and the sliding plates. The sliding plates 520a1, a2 contain slots 520d1, d2, respectively, through which the bolts of the bolt assemblies extend. The shafts of the bolts are capped with the stop nuts.

As shown in FIG. 5C, notch 520e may be used to lock the sliding plate in the "up" position by pulling up and back on the handle 521. The resulting tension in springs 520b1, b2 may lock the sliding plates on the bolt shafts extending through threaded rod connectors of the bolt assemblies 522a1, a2. In this position, brake shoes 520c1, c2 may not be in contact with the wheels and the brakes are "off". In some implementations, additional notches may be included to lock the sliding plates in additional positions. For example, a notch can be located such that the brakes are partially "on" to slow down the transport device as it is pushed downhill, for example.

Figure 5D:
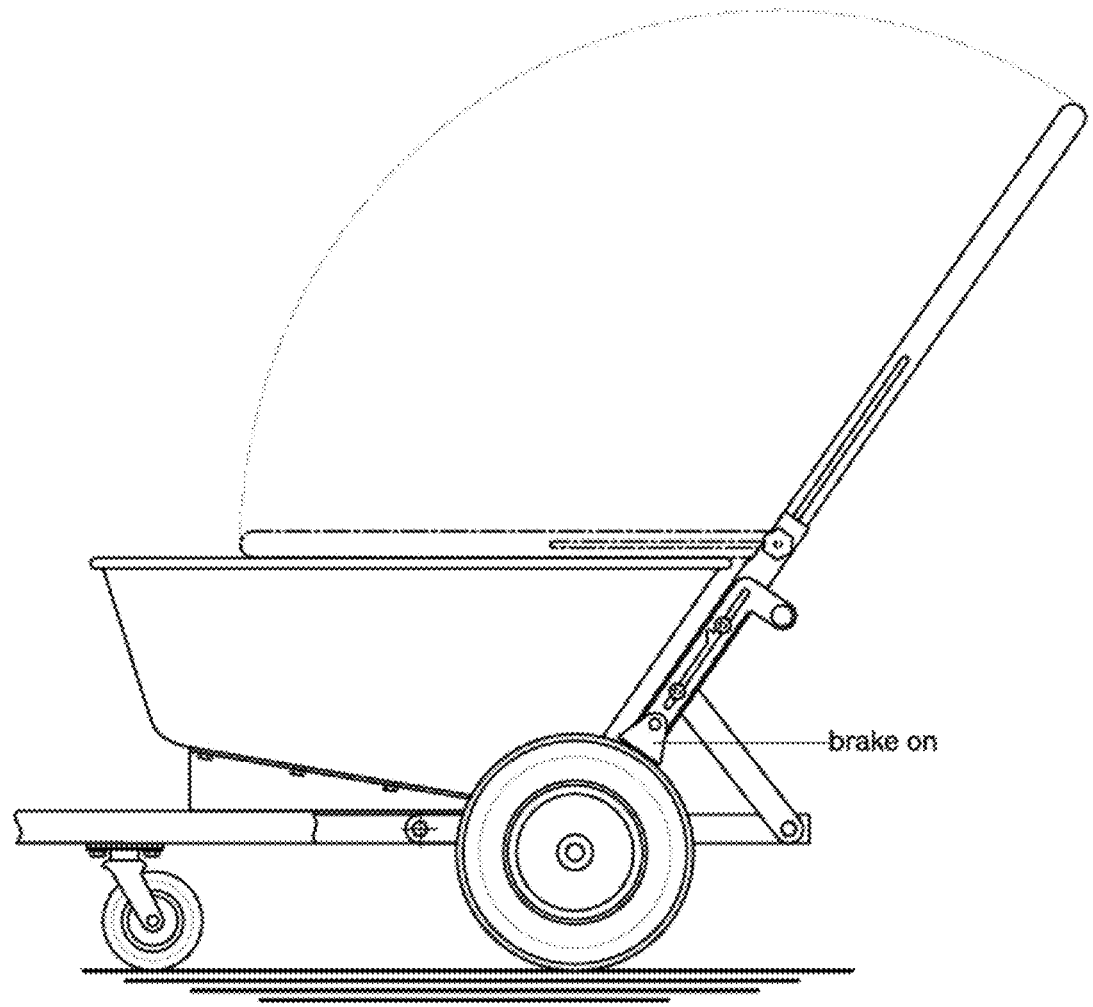

If handle 521 is pulled up and pushed forward, the notch no longer restrains the sliding plate and tension springs 520b1, b2 may pull the sliding plates down forcing brake shoes 520c1, c2 in contact with the back wheels, thus stopping the transport vehicle. In some implementations, since there is tension in the springs 520b1, b2 in the "off" position, releasing the sliding plates from the notch 520e may result in the breaks immediately being applied. In some implementations, this provides both emergency brakes and regular brakes in the same assembly. In this position, as shown in FIG. 5D, the brakes are "on".

By the operator pushing down on handle 521, additional braking action can be applied above that produced by the tensile springs. By putting the brakes in the "on" position and by lifting up or pushing down on handle 521, an operator can control the transport device when going downhill. This braking design allows the operator to engage the brakes either with his hand or knee.

Four wheels eliminate the side to side symmetry requirements for a loaded wheelbarrow. Incorporation of four wheels allows the tub to be wider without risk of prematurely dumping.

Implementations with swivel casters 130 on the front of the transport device permit the transport device to function as a wagon, thus providing four wheels to carry the load. A typical wagon has a handle or tongue that is attached to a plate that is attached to the wagon bed so that the plate (and the direction of the front wheels) can rotate relative to the bed. An axle is attached to the plate onto which are placed the front wheels. This arrangement allows the wagon to be guided with the handle or the tongue. A wagon attached to motor vehicle is extremely difficult to back in a desired direction because a wagon tends to jackknife. A transport device with swivel casters on the front can be guided by the tongue just as a wagon can be. However, the casters are independent of the tongue's position and not dependent as are the wheels of a wagon. The casters swivel to the proper direction from the side pressure that is applied when the tongue is turned. Since the swivel casters are independent of the tongue (but respond to side pressure), transport devices with swivel casters back like a trailer.

Some transport device implementations have either rigid casters or a fixed axle on the front. These transport devices are turned by lifting either the front or back wheels off the ground and swiveling on the other set of wheels still in contact. These implementations may be pulled with a motor vehicle if the relative vertical positions of the tow bar on the motor vehicle and the tongue on the transport device are located so that the front wheels are off the ground when the transport device is hitched to the motor vehicle. In this implementation, the transport device functions as a trailer. If this is not the case, there is a risk of damage to rigid wheels on the front when the transport device is being towed.

Reference throughout this specification to "an embodiment" or "implementation" or words of similar import means that a particular described feature, structure, or characteristic is included in at least one embodiment of the present invention. Thus, the phrase "in an embodiment" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

The invention claimed is:

1. A transport device comprising:
   a pair of longitudinal frame supports to support a tub;
   wherein the frame supports are operatively connected to a bottom of the tub;
   a dumping assembly comprising a pair of handles wherein each handle has a first end and a second end and a pair of fulcrum arms wherein each fulcrum arm has a first end and second end, wherein the second ends of the pair of handles are attached to the pair of fulcrum arms at a point along a length of the fulcrum arms, respectively, and wherein each of the pair of fulcrum arms at the first end is pivotally connected at a pivot point to the pair of frame supports, respectively, wherein the dumping assembly is configured to pivot the frame supports downward and rotate the fulcrum arms upward at the pivot point when the first ends of the handles are moved down thereby causing the tub to rotate to an extent to cause content in the tub to be removed from the tub.

2. The transport device of claim 1 further comprising a front end assembly having a hole and configured to be attached to a motor vehicle.

3. The transport device of claim 2 further comprising:
   a top portion having a hole assembly;
   a bottom portion having a hole; and
   an opening between the top portion and the bottom portion.

4. The transport device of claim 1 further comprising:
   a workbench attached to the handles and configured to foldout and lay on top of the tub.

5. The transport device of claim 1 further comprising:
   two front wheels; and
   two back wheels.

6. The transport device of claim 5 wherein the two front wheels are caster wheels.

7. The transport device of claim 1 further comprising a braking assembly wherein the braking assembly comprises:
   a brake handle;
   a pair of sliding plates wherein each sliding plate has a first end and a second end, wherein the first ends of the pair of sliding plates are attached to the brake handle on opposite ends of the brake handle, respectively, wherein each of the sliding plates include a slot extending lengthwise and having a notch and wherein the pair of sliding plates are attached to the pair of handles of the dumping assembly, respectively, via at least one pair of connectors, respectively, wherein each of the connectors is configured to extend through the slot of the respective sliding plate and fit in the notch of the respective sliding plate;
   a pair of tension springs wherein each of the tensions springs has a first end and a second end, wherein the first ends of the pair of tension springs are attached to the pair of sliding plates, respectively, and the second ends of the pair of tension springs are attached to the dumping assembly; and
   a pair of brake shoes attached to the second ends of the pair of sliding plates, respectively.

8. A method of using the braking assembly of the transport device of claim 7 comprising:
   pulling up on the braking handle and resting the sliding plates on the connectors at the notches in the slots of the sliding plates.

9. The method of claim 8 further comprising:
   while the sliding plates rests on the connectors, removing the connectors from notches in the slots of the sliding plates by pulling up and pushing forward on the brake handle.

10. The transport device of claim 1 wherein the handles are adjustable to change a height or orientation of the handles.

11. A transport device comprising:
   a pair of longitudinal frame supports;
   a dumping assembly comprising a pair of handles wherein each handle has a first end and a second end and a pair of fulcrum arms wherein each fulcrum arm has a first end and second end, wherein the second ends of the pair of handles are attached to the pair of fulcrum arms at a point along a length of the fulcrum arms, respectively, and wherein each of the pair of fulcrum arms at the first end is pivotally connected at a pivot point to the pair of frame supports, respectively, wherein the dumping assembly is configured to pivot the frame supports downward and rotate the fulcrum arms upward at the pivot point when the first ends of the handles are moved down.

12. The transport device of claim 11 wherein the handles are adjustable to change a height or orientation of the handles.

13. A method of dumping using the transport device of claim 12 comprising:
   rotating the handles in a counterclockwise direction; and
   moving the first ends of the handles in a downward direction.

14. A method of dumping using the transport device of claim 11 comprising:
   connecting a bottom of a tub to the frame supports; and
   moving the first ends of the handles in a downward direction.

* * * * *